(12) United States Patent
McKee et al.

(10) Patent No.: US 11,105,069 B2
(45) Date of Patent: Aug. 31, 2021

(54) VEHICLE

(71) Applicant: JC Bamford Excavators Limited, Uttoxeter (GB)

(72) Inventors: Michael McKee, Uttoxeter (GB); Matt Cook, Uttoxeter (GB)

(73) Assignee: JC Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 14/578,293

(22) Filed: Dec. 19, 2014

(65) Prior Publication Data

US 2015/0176249 A1   Jun. 25, 2015

(30) Foreign Application Priority Data

Dec. 24, 2013   (GB) ..................................... 1322972

(51) Int. Cl.
*E02F 9/20* (2006.01)
*B60K 26/02* (2006.01)
(Continued)

(52) U.S. Cl.
CPC ............ *E02F 9/2012* (2013.01); *B60K 26/02* (2013.01); *B60K 37/00* (2013.01); *E02F 3/964* (2013.01);
(Continued)

(58) Field of Classification Search
CPC ..... B60K 26/02; B60K 26/024; E02F 9/2012; B60Y 2026/029; B60Y 2200/41; B60Y 2200/412; B60Y 2200/415
See application file for complete search history.

(56) References Cited

U.S. PATENT DOCUMENTS 6,694,240 B1 *   2/2004   Swick ..................... E02F 9/166
                                                          701/50
7,243,756 B2 *   7/2007   Muraro .................. B60N 2/143
                                                          180/321
(Continued)

FOREIGN PATENT DOCUMENTS

CN           103403264 A    11/2013
GB             1066238 A     4/1967
WO       WO-2013116531 A1    8/2013

OTHER PUBLICATIONS

Search Report for GB1322972.9, dated Jul. 24, 2014.
(Continued)

*Primary Examiner* — Barry Gooden, Jr.
(74) *Attorney, Agent, or Firm* — Marshall, Gerstein & Borun LLP

(57) ABSTRACT

A vehicle including an engine, the engine being selectably operably couplable to ground engaging motive means, the vehicle including a foot throttle for selectively controlling power delivery from the engine, a hand throttle for selectively controlling power delivery from the engine and an operator seat being moveable between a front facing position and a rear facing position,
the vehicle including a static operating mode in which:
the operator seat faces forwards,
the engine is decoupled from the ground engaging motive means and/or a park brake is on, and,
the foot throttle is the default throttle
the vehicle further including an excavation mode in which:
the operator seat faces rearwards,
the engine is decoupled from the ground engaging motive means and
the hand throttle is the default throttle.

20 Claims, 2 Drawing Sheets

(51) Int. Cl.
  *E02F 3/96* (2006.01)
  *E02F 9/16* (2006.01)
  *B60K 37/00* (2006.01)

(52) U.S. Cl.
  CPC ............ *E02F 9/166* (2013.01); *E02F 9/2066* (2013.01); *B60K 2026/029* (2013.01); *B60K 2370/197* (2019.05); *B60K 2370/61* (2019.05); *B60Y 2200/41* (2013.01); *B60Y 2200/412* (2013.01); *B60Y 2200/415* (2013.01)

(56) References Cited

U.S. PATENT DOCUMENTS

| | | | | |
|---|---|---|---|---|
| 7,283,903 B2 * | 10/2007 | Merten | ............... | E02F 9/166 172/4.5 |
| 7,681,686 B1 * | 3/2010 | Kias | ............... | B60K 26/00 180/329 |
| 7,784,581 B1 * | 8/2010 | Kias | ............... | B60N 2/4693 180/329 |
| 7,857,086 B2 * | 12/2010 | Wakuta | ............... | E02F 3/964 180/273 |
| 8,041,485 B2 * | 10/2011 | Prasetiawan | ............... | E02F 9/166 180/330 |
| 2009/0012679 A1 | 1/2009 | Prasetiawan et al. | | |
| 2009/0018745 A1 * | 1/2009 | Prasetiawan | ............... | E02F 9/166 701/99 |
| 2009/0313862 A1 | 12/2009 | Wakuta et al. | | |
| 2010/0320022 A1 * | 12/2010 | Kias | ............... | B60N 2/4693 180/326 |
| 2013/0193729 A1 * | 8/2013 | VanMiddendorp | ............... | A47C 3/18 297/311 |
| 2014/0379229 A1 * | 12/2014 | Walz | ............... | E02F 9/2217 701/50 |
| 2015/0197920 A1 * | 7/2015 | McKee | ............... | E02F 9/085 701/50 |
| 2015/0292182 A1 * | 10/2015 | McKee | ............... | B60N 2/14 414/685 |
| 2015/0376865 A1 * | 12/2015 | McKee | ............... | E02F 9/085 701/49 |
| 2017/0016209 A1 * | 1/2017 | Kuroshita | ............... | E02F 3/964 |

OTHER PUBLICATIONS

Extended European Search Report for EP 1419377.7, dated Sep. 13, 2016.
Examination Report for GB 1322972.9, dated Apr. 1, 2016.
Search and Examination Report for GB 1516356.1, dated Apr. 1, 2016.
Office Action for MX/a/2014/015047, dated Jan. 9, 2018.
Examination Report for AU 2014280911, dated Jan. 5, 2018.
Office Action for CN 201410816656.0, dated Oct. 9, 2017.
Search Report for CN 201410816656.0, dated Sep. 23, 2017.
Examination Report for AU 2014280911, dated May 10, 2018.
Office Action for Mexican Application No. MX/a/2014/015047, dated Jul. 5, 2017.

* cited by examiner

VEHICLE

TECHNICAL FIELD

The present invention relates to a vehicle, in particular a working vehicle.

BACKGROUND OF THE INVENTION

Known working vehicles, such as back hoe loaders have a materials handling implement such as a loading shovel mounted on the front of the machine and a further materials handling implement such as a back hoe, mounted on the back of a machine.

When the operator wishes to use the loading shovel the seat is orientated in a forwards facing direction and the operator can use controls such as the steering wheel, a foot brake, a foot clutch, a foot accelerator, a gear box having forward and reverse gears, and hand operated controls to lift and lower a loading arm and crowd or dump the loading shovel in order to manoeuvre material.

When it is necessary to move the back hoe loader from one location to another location, typically via public highway, the loading shovel will be lifted above ground level and the back hoe loader can be driven, in the manner of a car (automobile) with the operator facing forwards and using the steering wheel, brake, clutch and throttle controls.

When using the back hoe the seat can be rotated to face rearwardly. When using the back hoe the vehicle will be stationary, and indeed some or all of the wheels may be lifted off the ground by operation of stabiliser legs and/or lowering of the front shovel into engagement with the ground. When operating the back hoe various hydraulic rams will be needed to operated which are supplied by pressurised hydraulic fluid from a pump driven by the engine. The power required to drive the pump may require the engine to be set at an engine speed above a normal idle speed. In order to set the engine speed above a normal idle speed a hand throttle is provided which is located in a convenient position for operation by the operator when the seat is facing rearwardly.

Furthermore, because the back hoe loader has a hydraulic pump driven by an engine, it is possible to connect an external service, such as a hydraulically operated water pump or other hydraulically operated external machine tools such as a breaker hammer, an earth drill, a submersible pump, a disc cutter, a diamond core drill, an impact wrench, a vibratory plate etc. Under these circumstances the vehicle will be stationary and it is not necessary for an operator to be in the cab. The external service may require the engine to be set at a working speed which is above idle speed, in which case the hand throttle is utilised to set an appropriate engine speed.

Also an auto idle function is known whereby if the hand throttle has been used to set an engine working speed then if the system detects that the engine is not operating a load, then the engine speed may be reduced to a speed less than the working speed, and may be reduced to an idle speed, thereby saving fuel. The engine speed may be reduced to an idle speed in one step or may be progressively reduced to an idle speed. Upon the application of a load, the engine speed will increase to the working speed as set by the hand throttle. Thus, the system saves fuel if no work is being done but nevertheless automatically returns to the hand throttle speed setting (the "working speed") when work is restarted, thereby not requiring the operator to reset the engine speed.

SUMMARY OF THE INVENTION

Thus according to the present invention there is provided a vehicle including an engine, the engine being selectably operably couplable to ground engaging motive means, the vehicle including a foot throttle for selectively controlling power delivery from the engine, a hand throttle for selectively controlling power delivery from the engine and an operator seat being moveable between a front facing position and a rear facing position,
  the vehicle including a static operating mode in which:
  the operator seat faces forwards,
  the engine is decoupled from the ground engaging motive means and/or a park brake is on, and
  the foot throttle is the default throttle
  the vehicle further including an excavation mode in which:
  the operator seat faces rearwards,
  the engine is decoupled from the ground engaging motive means and
  the hand throttle is the default throttle.

Thus, according to another aspect of the present invention there is provided a vehicle including an engine, the engine being selectably operably couplable to ground engaging motive means, the vehicle including a foot throttle for selectively controlling power delivery from the engine, a hand throttle for selectively controlling power delivery from the engine and an operator seat being moveable between a front facing position and a rear facing position,
  the vehicle including a transport operating mode in which:
  the operator seat faces forwards,
  the engine is coupled to the ground engaging motive means and/or a park brake is off, and
  the foot throttle is the default throttle
  the vehicle further including an excavation mode in which:
  the operator seat faces rearwards,
  the engine is decoupled from the ground engaging motive means,
  the hand throttle is the default throttle.

Thus, according to another aspect of the present invention there is provided a vehicle including an engine, the engine being selectably operably couplable to ground engaging motive means, the vehicle including a foot throttle for selectively controlling power delivery from the engine, a hand throttle for selectively controlling power delivery from the engine and an operator seat being moveable between a front facing position and a rear facing position,
  the vehicle including a static operating mode in which:
  the operator seat faces forwards,
  the engine is decoupled from the ground engaging motive means and/or a park brake is on, and
  the foot throttle is the default throttle
  the vehicle including a transport operating mode in which:
  the operator seat faces forwards,
  the engine is coupled to the ground engaging motive means and/or a park brake is off, and
  the foot throttle is the default throttle
  the vehicle further including an excavation mode in which:
  the operator seat faces rearwards,
  the engine is decoupled from the ground engaging motive means and
  the hand throttle is the default throttle.

Thus, according to another aspect of the present invention there is provided a method of operating a vehicle as defined in any preceding claim including the step of:
  operating the vehicle in the static operating mode with the engine operating at an idle speed and with the hand operated control set at a working speed above an idle speed, the method further including the step of moving the seat to the rear facing position to enable the excavation mode such that the engine speed increases to the working speed.

BRIEF DESCRIPTION OF THE DRAWINGS

The invention will now be described, by way of example only, with reference to the accompanying drawings in which.

DETAILED DESCRIPTION OF THE INVENTION

Figure 1:
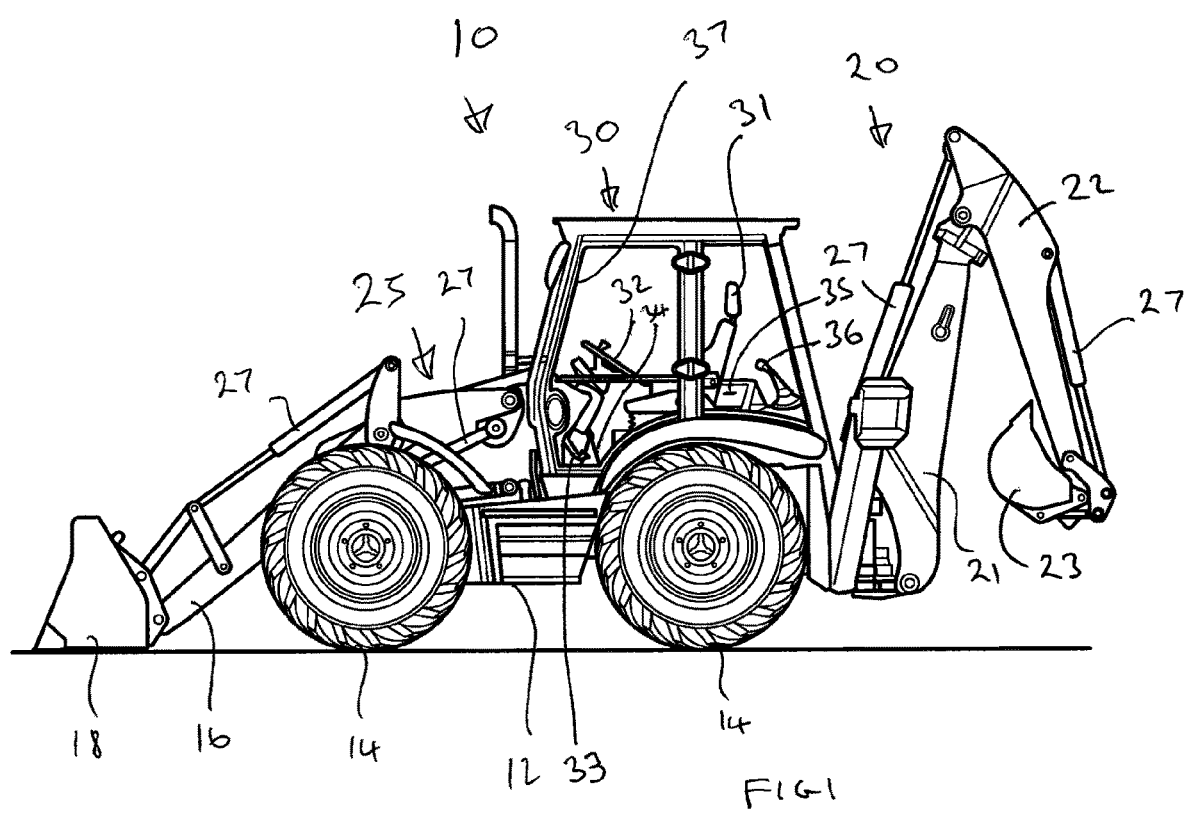
FIG. 1 is a side view of a vehicle according to the present invention.

With reference to FIG. 1 there is shown a material handling vehicle in the form of a back hoe loader 10 having a chassis 12 supported by ground engaging motive means in the form of wheels 14. Mounted on the chassis is a loading arm 16 at the front of which is mounted an implement, in this case a loading shovel 18. The loading arm and loading shovel are mounted on the front of the vehicle.

Mounted on the back of the vehicle is a back hoe 20 having a boom 21, a dipper arm 22, and a bucket 23. The vehicles includes an engine 25 which provides power to drive the vehicle over the ground. The engine 25 also provides power to operate a hydraulic pump which can selectively provide pressurised hydraulic fluid to the various rams 27 of the vehicle to operate the loading arm, loading shovel, boom, dipper, bucket etc so as to enable material to be handled. The vehicles includes an operator cab 30 including an operator seat 31. The operator cab includes operator controls such as a steering wheel 32, a foot brake 33, a foot throttle 34, a hand throttle 35 and back hoe control lever 36.

Figure 2:
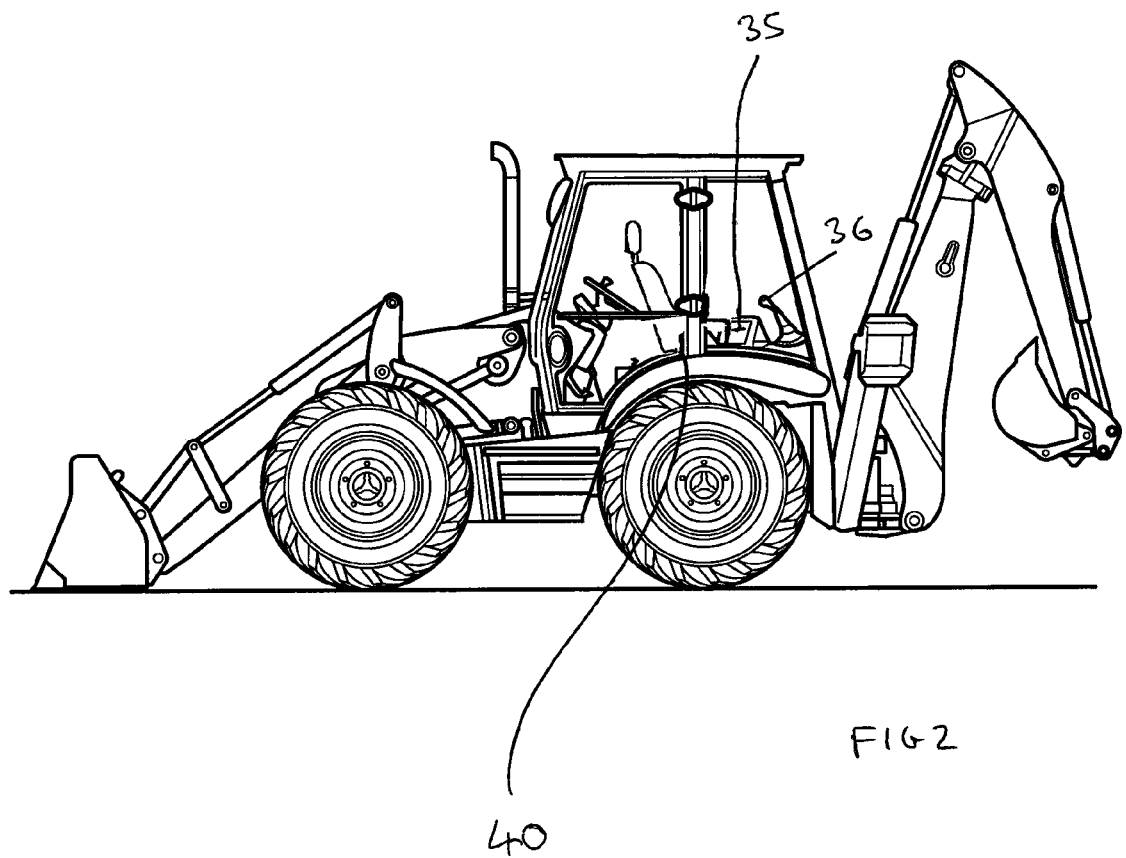
FIG. 2 is a side view of the vehicle of FIG. 1 with the operator seat facing rearwardly.

As shown in FIG. 1 the operator seat 31 is facing forwards. The operator seat is rotatable and can be rotated to the position shown in FIG. 2 where it faces the rear of the vehicle. The vehicle includes a seat position sensor 40 which can determine if the seat is facing forwards as shown in FIG. 1 or facing the rear as shown in FIG. 2. When being moved from the FIG. 1 position to the FIG. 2 position the seat rotates anticlockwise when viewed from above. The seat position sensor 40 may be able to determine one or more intermediate positions of the seat between the forward facing position shown in FIG. 1 and the rear facing position shown in FIG. 2.

The vehicle includes a cab door 37 on the left hand side of the vehicle. Thus, starting with the operator in the cab with the seat positioned as shown in FIG. 1, if the operator wishes to exit the cab then the seat may be turned towards the operators left (i.e. anticlockwise when viewed from above) so that the seat faces the door (i.e. the seat is partially facing forwards and partially facing to the left of the vehicle). In this position it is easy for the operator to exit the cab through the door. Alternatively, starting with the seat in the position as shown in FIG. 1, if the operator wishes to operate the back hoe, then the seat can be rotated through 180° to the position shown in FIG. 2.

Under some circumstances the back hoe may be predominantly operated on the left hand side of the vehicle (when considering the forwards direction of the vehicle) i.e. on the right hand side of the operator when the seat is in the FIG. 2 position. Under these circumstances, it is convenient for the seat to be turned slightly clockwise (when viewed from above) from the FIG. 2 position to a position where the seat faces partially towards the rear of the vehicle and partially towards the left side of the vehicle.

Figure 3:
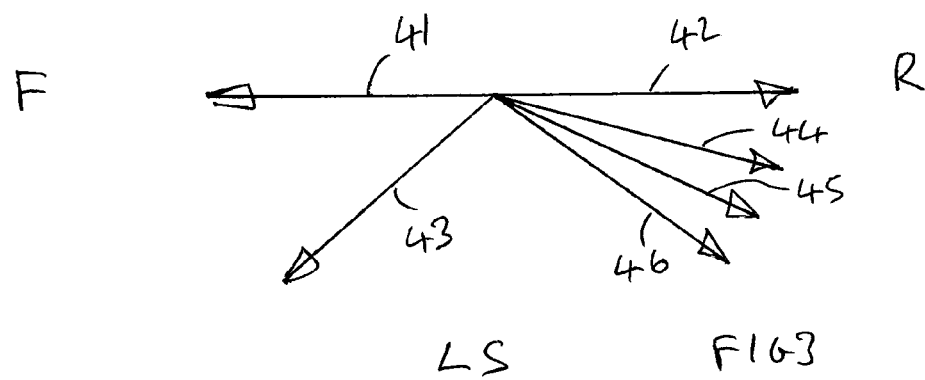
FIG. 3 shows a plan schematic view of the vehicle of FIGS. 1 and 2 showing various directions in which the seat can face.

FIG. 3 shows a schematic plan view of the back hoe loader 10. F indicates the front of the back hoe loader and R represents the back of the back hoe loader. LS represents the left side of the back hoe loader. Arrows 41, 42, 43, 44, 45 and 46 represent the direction in which the seat can be positioned to face.

Thus, arrow 41 represents the seat facing a forwards direction as shown in FIG. 1. Arrow 42 represents the seat facing a rearward direction as shown in FIG. 2. Arrow 43 represents the seat facing partially forwards and partially towards the left hand side. This is the position at which the seat will typically be facing when the operator exits the cab through the door 37. Arrows 44, 45 and 46 show the direction in which the seat may be facing when the operator is using the back hoe primarily when the back hoe is positioned on the left hand side of the vehicle. Arrows 44, 45 and 46 represent the seat facing partially backwards and partially towards the left hand side.

The seat position sensor 40 may be able to determine when the seat is in one or more of positions 41, 42, 43, 44, 45 and 46, and may also be able to determine when the seat is in any intermediate position between positions 41 and 42. A seat lock may be provided to lock the seat in one or more of positions 41, 42, 43, 44, 45, 46 or any intermediate position.

The back hoe loader has certain operating modes.

Thus, the vehicle has a static operating mode. In this mode the operator seat faces forwards as shown in FIG. 1. The engine is decoupled from the ground engaging motive means, e.g. a gear box may be in neutral such that the engine does not drive the wheels 14.

The vehicle also has a transport mode. In the transport mode the operator faces forwards. The engine is coupled to the ground engaging motive means, for example the gear box will be in gear and the engine will be turning the wheels 14 either in a forwards direction or a reverse direction.

The vehicle also has an excavation mode. In the excavation mode the operator seat faces rearwards as shown in FIG. 2. The engine is decoupled from the ground engaging motive means, e.g. the gear box is in neutral.

When the particular requirements of an operating mode are satisfied, then the control of the engine will default to a particular throttle. Thus when the requirements of the static operating mode are met, the control of the engine will default to the foot throttle. When the particular operating requirements of the transport mode are met, then the control of the engine will default to the foot throttle. When the particular requirements of the excavation mode are met, then control of the engine will default to the hand throttle.

For certain modes, once in that mode the control of the engine can be transferred away from the default throttle. Furthermore, once the control has been transferred away from the default throttle, it can be transferred back to the default throttle.

Consider the following sequence of events:

The operator's seat is facing forwards and the gear box is in neutral. The engine is running at idle speed.

The operator turns the seat to face rearwards. Once this has been done the conditions for the excavation mode have been met and accordingly the engine control defaults to the hand throttle. Thus if the hand throttle has been set to 1200 rpm, then the engine will run at 1200 rpm and if the hand throttle has been set to 2000 rpm, then the engine will run at 2000 rpm.

If the seat is then turned to face forwards, then the static operating mode conditions are met and the engine control defaults to the foot throttle. Typically as the seat turns to face forwards, the operator's foot will not be on the foot throttle and accordingly the foot throttle will be set to an idle speed and hence the engine rpm will fall to that idle speed. Should the operator depress the foot throttle to a 2000 rpm position, then the engine speed will increase to 2000 rpm. Should the operator release the foot pedal, then the engine speed will return to an idle rpm.

In the static operating mode it is possible to transfer engine control to the hand throttle by setting the hand throttle at an idle speed level above the instant engine speed level set by the foot throttle. Thus if the position of the foot throttle is at idle, then operating the hand throttle to a position of above idle will transfer the engine control away from the foot throttle and to the hand throttle. Subsequently the hand throttle can be increased to increase the engine speed and to decrease the engine speed.

Engine control can be transferred back to the foot throttle simply by operating the foot throttle. Alternatively engine control can be transferred back to foot throttle by operating a brake pedal. Alternatively engine control can be transferred to the foot throttle by engaging a gear. The reason engine control transfers to the foot throttle is that by engaging a gear the conditions for transport mode are met (i.e. the seat is facing forward and the engine is coupled to the ground engaging motive means, and in these circumstances the default throttle control is the foot throttle.

When in transport mode, it is not possible to transfer engine control to the hand throttle.

Having a default throttle for a particular mode has certain advantages. The default throttle is the most appropriate throttle for the majority of operations to be carried out in that mode.

In a static mode where an external machine tool is being used, the operator can increase the engine speed using the foot throttle to a level appropriate for the machine tool. The operator can then transfer that foot throttle setting to the hand throttle setting by increasing the hand throttle to (just) above the foot throttle level. Thus the operator can quickly set and hold an engine speed appropriate for a machine tool. In the event that final adjustment of the engine speed is required, then the operator can increase or decrease the engine speed accordingly by using the hand throttle. Should the operator wish to transfer engine speed control to the foot throttle, then the operator can simply operate the foot throttle, whereupon engine speed will be determined by foot throttle position.

When in the transport mode the default throttle (the foot throttle) is the only throttle that can control the engine, i.e. it is not possible to control the engine by the hand throttle.

By way of example, consider the situation where the operator is required to dig a trench. The operator will drive the vehicle in the transport mode to a position where the start of the trench is to be dug. The operator will then turn the seat 180° and operate the machine in excavation mode to dig the first part of the trench. After a short while it would become necessary for the operator to move the machine forwards to continue the trench. This is done by turning the seat to the forwards direction, driving the machine forwards (in transport mode) perhaps the length of the machine wheelbase, turning the seat to face rearwardly and then operating the machine in excavation mode to dig a continuation part of the trench. The operator will then continue to turn the seat, drive the machine forward, turn the seat and continue to excavate the trench until such time as the whole length of the trench has been dug.

A transport mode and excavation mode of the present invention reduce the drive fatigue as follows.

By way of example, the engine of the working machine may idle at 800 revs per minute (rpm). Under certain conditions it may be necessary to run the engine at 2000 rpm to operate the back hoe to excavate the trench. Under these circumstances the hand throttle can be set to run the engine at 2000 rpm. Significantly, the hand throttle can be left at this setting which therefore does not need to be changed by the operator. Under these circumstances, when digging a trench, the following sequence of events happens:

When the machine is being manoeuvred in the transport mode so as to position the back hoe over the start of the trench, because in the transport mode the foot throttle is the default throttle, then when the operator removes his or her foot from the throttle pedal the engine will return to an idle speed and when the operator needs to move the vehicle forwards or backwards the foot throttle can be used to vary the vehicle speed. Once the vehicle has been positioned, the operator will turn the seat in an anticlockwise direction. Because the operator is sitting in the seat, as the operator and seat turn together, the operators right foot, which operates the foot throttle, will naturally be moved away from the foot throttle and the engine will therefore return to an idle speed if not already at an idle speed. Once the seat position sensor 40 determines that the seat is facing rearwardly, the vehicle then operates in the excavation mode. Since in the excavation mode the hand throttle is the default throttle, and since the hand throttle has previously been set to 2000 rpm, the act of rotating the seat from the forwards position to the rearwards position results in the engine speed increasing from idle (800 rpm) to 2000 rpm. Thus as soon as the seat reaches the reward facing position the engine revs are increased to a speed wherein the back hoe can be operated and the operator can immediately start digging the trench. Significantly, as the seat moves to the rearward facing position it is not necessary for the operator to operate the hand control to speed up the engine speed (since this is done automatically by virtue of the criteria of the excavation mode being met) and this saves time.

Once the first part of the trench has been dug the operator then turns the seat from the rearward facing position to the forward facing position. This will result in the machine no longer being in the excavation mode rather it will initially return to the static mode as the seat tends to face forwards. This means that the foot throttle will control the engine speed which will therefore drop from 2000 rpm down to an idle speed of 800 rpm. This idle speed is a suitable engine speed for the transport mode of operation. Thus as the seat swings to the forwards position the engine revs drop down to 800 rpm idle speed and then the operator can immediately put the machine in transport mode to move the vehicle over the ground. Since in transport mode the default throttle is the foot throttle, varying of the engine speed is done via the foot throttle. Once the machine has been repositioned, the operator then swings the seat from the forwards facing position to the rearwards facing position, the act of which causes the engine speed to increase from idle speed to the preset 2000 rpm speed set by the hand throttle and the machine is immediately able to continue digging the trench. Thus, once the hand throttle has been set once (in this example to 2000 rpm) then the whole of the trench can be dug without the operator ever having to touch or adjust the hand throttle. As far as the operator is concerned, when the seat faces forwards the engine will be running at idle speed unless the operator operates the foot throttle and this is the normally expected operating mode with a forward facing seat (akin to driving a car (automobile)). When the seat is facing rearwardly the engine speed will always be at the operator desired working speed (in this case 2000 rpm) as set by the hand throttle. As such, operator fatigue is reduced since the engine runs at a speed appropriate for the direction in which the seat is facing.

In a preferred embodiment vehicles according to the present invention may also include an auto idle function. As mentioned above, an auto idle function operates if the hand throttle has been used to set an engine working speed above an idle speed.

The auto idle function may be enabled or may be disabled, depending upon operator preference.

Digging a trench or the like, often carried out in conjunction with a manual labourer working outside the cab sometimes in or near the trench or the like. The manual labourer may look out for buried water pipes, gas pipes, electricity cables or other buried articles which need to be avoided by the machine implement and which sometimes the machine operator cannot readily see. Accordingly communication between the machine operator and the manual labourer is important. Advantageously where a machine has an auto idle function, and where it is enabled, when the criteria for the excavation mode are met, then the auto idle function can reduce the engine speed below a level set by the hand throttle. Typically the auto idle will reduce the engine speed to the idle speed.

Thus under these circumstances consider the scenario where a trench is being dug in conjunction with a manual labourer and the machine has been advanced forwards in order to dig a further part of the trench. As the operator starts to swing the seat towards the excavation position his or her foot will come off the foot throttle and the engine will therefore be running at an idle speed (if it is not already running at idle speed). As the seat reaches the rearward facing position, the criteria for the excavation mode are met, but additionally the auto idle function moderates the hand throttle setting. In one example, rather than the engine speed increases to 2000 rpm (as set by the hand throttle) as the seat reaches the rear facing position, the engine speed remains at idle speed (800 rpm). Because the engine is running slower it produces less noise and the machine operator is able to talk to the manual labourer. Once between them they decide to continue digging the trench, then as soon as the machine operator operates the back hoe, the auto idle system will automatically cause the engine speed to revert back to the hand throttle speed setting (the working speed, in this case 2000 rpm). As will be appreciated, operating machine in this manner does not require the operator to adjust the hand throttle and this is therefore time saving.

As mentioned above, in vehicles according to the present invention when using the transport mode the hand throttle cannot be used to control engine speed. Accordingly, the hand throttle cannot be used as a form of cruise control. Vehicles according to the present invention may therefore include an operator actuated speed hold device (such as a button or switch or the like) which, when actuated maintains the current speed of the engine or endeavours to achieve a desired engine speed as indicated by a foot throttle pedal. This can act as a cruise control device. Thus, when the operator reaches a desired vehicle speed, which equates to a particular engine speed in a particular gear, then he or she can operate the operator actuated speed hold device so as to maintain the speed of the engine, and hence maintain the speed of the vehicle. The operator actuated speed hold device can be disabled either by actuating the operator actuated speed hold device again and/or by operating the brake pedal and/or by operating a park brake lever or the like and/or by decoupling the engine from the ground engaging motive means, for example by putting a gearbox into neutral. The operator actuated speed hold device may also be disabled by moving a foot throttle pedal, for example pressing and immediately releasing the foot throttle pedal.

The vehicle may have various sensors, for example a foot throttle position sensor, a hand throttle position sensor, a seat position sensor (as mentioned above), a gearbox neutral sensor. The foot throttle may be mechanically coupled to the engine to control the engine speed. The hand throttle may be mechanically coupled to the engine to control the engine speed.

The foot throttle may not be mechanically coupled to the engine. The hand throttle may not be mechanically coupled to the engine. The foot throttle may include a foot throttle sensor for sensing a position of the foot throttle representative of a desired engine speed. The hand throttle may include a hand throttle sensor for determining a position of the hand throttle representative of a desired engine speed. Signals from a foot throttle sensor and/or a hand throttle sensor may be fed to a control unit. Signals from a seat position sensor may be fed to a control unit. Signals from a neutral sensor may be fed to a control unit. Dependent upon the signals received by a control unit the control unit may determine a mode of operation of the vehicle.

As described above, the engine may be coupled to a ground engaging means by a gear box which enables driving in a forwards direction or a reverse direction. The invention is not restricted to vehicles having gearboxes having forward and reverse gears. In a further embodiment the vehicle may include a hydrostatic transmission which can drive the wheels in a forwards or reverse direction by virtue of pumping pressurised hydraulic fluid as is well known in the art.

As mentioned above, in transport mode the operator faces forwards, the engine is coupled to the ground engaging means. In an alternative transport mode the operator faces forwards, an operator control indicative of a desire to move the vehicle over the ground is actuated. One example of an operator control indicative of a desire to move the vehicle over ground is the engagement of a gear of a gearbox. Alternatively, the release of a parking brake is indicative of a desire to move the vehicle over the ground. Alternatively, where the vehicle has a hydrostatic transmission, the movement of a control that actuates the hydrostatic transmission such that the vehicle can move forwards or can move backwards is indicative of a desire to move the vehicle over the ground.

The invention claimed is:

1. A vehicle including an engine, the engine being selectably operably couplable to ground engaging motive means, the vehicle including a foot throttle for selectively controlling power delivery from the engine, a hand throttle for selectively controlling the power delivery from the engine, a control unit communicatively connected to the foot throttle and the hand throttle, an operator seat being moveable between a front facing position and a rear facing position, and an excavation means, the vehicle operable in a static operating mode when the operator seat is in the front facing position and (i) the engine is decoupled from the ground engaging motive means, or (ii) a park brake is on, wherein when the vehicle operates in the static operating mode, the control unit automatically assigns control of the power delivery from the engine to the foot throttle, the vehicle operable in an excavation mode when the operator seat is in the rear facing position and the engine is decoupled from the ground engaging motive means, wherein when the vehicle operates in the excavation mode, the control unit automatically assigns the control of the power delivery from the engine to the hand throttle, wherein the vehicle includes an auto idle function which can be enabled or disabled, wherein when the vehicle operates in the excavation mode and the auto idle function is enabled, the engine is operable at a working speed setting of the hand throttle when the excavation means is operated, and the engine is operated at a speed below the working speed setting of the hand throttle when the excavation means is not operated, and wherein movement of the operator seat from the front facing position to the rear facing position causes the control unit to automatically increase the speed of the engine to a predetermined speed setting of the hand throttle upon operation of the excavating means by the operator, and wherein when the auto idle function is enabled and the engine is operated at a speed below the predetermined speed setting of the hand throttle, movement of the operator seat from the rear facing position to the front facing position causes the control unit to automatically assign the control of the power delivery from the engine to the foot throttle.

2. A vehicle as defined in claim 1, wherein the vehicle operates in the static operating mode when (i) the engine is decoupled from the ground engaging motive means and (ii) the park brake is on.

3. A vehicle as defined in claim 1, wherein when the vehicle operates in the static operating mode and the engine speed of the engine is set by the foot throttle, the control of the power delivery from the engine can be transferred to the hand throttle by increasing the hand throttle setting to above the engine speed set by the foot throttle.

4. A vehicle as defined in claim 3, wherein when the vehicle operates in the static operating mode, the control unit returns the control of the power delivery from the engine to the foot throttle responsive to operation of the foot throttle.

5. A vehicle as defined in claim 1, when the vehicle operates in the excavation mode, the control unit transfers the control of the power delivery from the engine to the foot throttle responsive to operation of the foot throttle.

6. A vehicle as defined in claim 5, wherein the control unit returns the control of the power delivery from the engine to the hand throttle responsive to operation of the hand throttle.

7. A vehicle as defined in claim 1, further including a seat position sensor for detecting a position of the operator seat, wherein when the seat position sensor detects the movement of the seat from the front facing position to the rear facing position, the vehicle automatically switches from the static operating mode to the excavation mode.

8. A vehicle as defined in claim 7, wherein when the seat position sensor detects the movement of the operator seat from the rear facing position towards the front facing position, the vehicle automatically switches from the excavation mode to the static operating mode.

9. A method of operating a vehicle as defined in claim 1 including the step of:

operating the vehicle in the static operating mode with the engine operating at an idle speed and with the hand throttle set at a working speed equal to the predetermined speed setting and above an idle speed, the method further including the step of moving the operating seat to the rear facing position, thereby switching the vehicle from the static operating mode to the excavation mode such that the engine speed increases to the working speed.

10. A method of operating a vehicle as defined in claim 9, further including the step of subsequently turning the seat from the rear facing position to the front facing position, thereby switching the vehicle from the excavation mode to the static operating mode such that the engine speed drops from the working speed to the idle speed.

11. A vehicle as defined in claim 1, wherein responsive to the movement of the seat between the front facing position and the rear facing position, the control unit automatically switches the control of the power delivery from the engine between the foot throttle and the hand throttle.

12. A vehicle as defined in claim 11, wherein responsive to the movement of the seat from the front facing position to the rear facing position, the control unit automatically switches the control of the power delivery from the foot throttle to the hand throttle.

13. A vehicle including an engine, the engine being selectably operably couplable to ground engaging motive means, the vehicle including a foot throttle for selectively controlling power delivery from the engine, a hand throttle for selectively controlling the power delivery from the engine, a control unit communicatively connected to the foot throttle and the hand throttle, an operator seat being moveable between a front facing position and a rear facing position, and an excavation means, the vehicle operable in a transport operating mode when the operator seat is in the front facing position and (i) the engine is coupled to the ground engaging motive means, or (ii) a park brake is off, wherein when the vehicle operates in the transport operating mode, the control unit automatically assigns control of the power delivery from the engine to the foot throttle, the vehicle operable in an excavation mode when the operator seat is in the rear facing position and the engine is decoupled from the ground engaging motive means, wherein when the vehicle operates in the excavation mode, the control unit automatically assigns the control of the power delivery from the engine to the hand throttle, wherein the vehicle includes an auto idle function which can be enabled or disabled, wherein when the vehicle operates in the excavation mode and the auto idle function is enabled, the engine is operable at a working speed setting of the hand throttle when the excavation means is operated, and the engine is operated at a speed below the working speed setting of the hand throttle when the excavation means is not operated, wherein movement of the operator seat from the front facing position to the rear facing position causes the control unit to increase the speed of the engine to a predetermined speed setting of the hand throttle upon operation of the excavating means by the operator, and wherein when the auto idle function is enabled and the engine is operated at a speed below the predetermined speed setting of the hand throttle, movement of the operator seat from the rear facing position to the forward facing position causes the control unit to automatically assign the control of the power delivery from the engine to the foot throttle.

14. A vehicle as defined in claim 13, wherein when the vehicle operates in the transport mode, the power delivery from the engine cannot be controlled by the hand throttle.

15. A vehicle as defined in claim 13, wherein the vehicle operates in the transport operating mode when (i) the engine is coupled to the ground engaging motive means and (ii) the park brake is off.

16. A vehicle as defined in claim 13, wherein when the vehicle operates in the transport operating mode and the foot throttle has been operated so the engine speed is at a working speed above an idle speed, an operator actuated speed hold device is operable to maintain the working speed of the engine if the foot throttle is released.

17. A vehicle as defined in claim 16, wherein the foot operated throttle can be operated to increase the engine speed above the working speed and release of the foot operated throttle returns the engine speed to the working speed.

18. A vehicle as defined in claim 16 wherein the operator actuated speed hold device can be disabled by at least one of: actuating the operator actuated speed hold control device, operating a brake pedal, operating the park brake on/off, decoupling the engine from the ground engaging motive means, or moving a foot throttle pedal.

19. A vehicle including an engine, the engine being selectably operably couplable to ground engaging motive means, the vehicle including a foot throttle for selectively controlling power delivery from the engine, a hand throttle for selectively controlling the power delivery from the engine, a control unit communicatively connected to the foot throttle and the hand throttle, an operator seat being moveable between a front facing position and a rear facing position, and an excavation means, the vehicle operable in a static operating mode when the operator seat is in the front facing position and (i) the engine is decoupled from the ground engaging motive means, or (ii) a park brake is on, wherein when the vehicle operates in the static operating mode, the control unit automatically assigns control of the power delivery from the engine to the foot throttle, the vehicle operable in a transport operating mode when the operator seat is in the front facing position and (i) the engine is coupled to the ground engaging motive means, or (ii) the park brake is off, wherein when the vehicle operates in the transport operating mode, the control unit automatically assigns the control of the power delivery from the engine to the foot throttle, the vehicle operable in an excavation mode when the operator seat is in the rear facing position and the engine is decoupled from the ground engaging motive means, wherein when the vehicle operates in the excavation mode, the control unit automatically assigns the control of the power delivery from the engine to the hand throttle, wherein the vehicle includes an auto idle function which can be enabled or disabled, wherein when the vehicle operates in the excavation mode and the auto idle function is enabled, the engine is operable at a working speed setting of the hand throttle when the excavation means is operated, and the engine is operated at a speed below the working speed setting of the hand throttle when the excavation means is not operated, wherein movement of the operator seat from the front facing position to the rear facing position causes the control unit to automatically increase the speed of the engine to a predetermined speed setting of the hand throttle upon operation of the excavating means by the operator, and wherein when the auto idle function is enabled and the engine is operated at a speed below the predetermined speed setting of the hand throttle, movement of the operator seat from the rear facing position to the forward facing position causes the control unit to automatically assign the control of the power delivery from the engine to the foot throttle.

20. A vehicle as defined in claim 19, wherein the vehicle operates in the static operating mode when (i) the engine is decoupled from the ground engaging motive means and (ii) the park brake is on, and wherein the vehicle operates in the transport operating mode when (i) the engine is coupled to the ground engaging motive means and (ii) the park brake is off.

\* \* \* \* \*